(12) United States Patent
Camacho-Cardoza et al.

(10) Patent No.: US 9,561,842 B1
(45) Date of Patent: Feb. 7, 2017

(54) REMOTE CONTROL MINE NEUTRALIZATION DELIVERY SYSTEM

(71) Applicants: Normary Camacho-Cardoza, La Plata, MD (US); Jean Pierre Ledee, Rio Piedras, PR (US)

(72) Inventors: Normary Camacho-Cardoza, La Plata, MD (US); Jean Pierre Ledee, Rio Piedras, PR (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 285 days.

(21) Appl. No.: 13/987,922

(22) Filed: Sep. 17, 2013

(51) Int. Cl.
*B63G 7/00* (2006.01)
*B63G 7/02* (2006.01)
*G05D 1/00* (2006.01)
*G05D 1/02* (2006.01)

(52) U.S. Cl.
CPC .............. *B63G 7/02* (2013.01); *G05D 1/0011* (2013.01); *G05D 1/0206* (2013.01); *B63G 2007/005* (2013.01)

(58) Field of Classification Search
USPC .................................. 89/1.13; 102/402, 403
See application file for complete search history.

(56) References Cited

U.S. PATENT DOCUMENTS

| | | | | |
|---|---|---|---|---|
| 2,404,806 | A * | 7/1946 | Lindsey et al. | 340/850 |
| 3,012,534 | A * | 12/1961 | Thomas | 114/242 |
| 3,471,777 | A * | 10/1969 | Rona | 324/247 |
| 3,826,215 | A * | 7/1974 | Dyjak | 114/221 R |
| 3,906,884 | A * | 9/1975 | Gould | 114/244 |
| 3,946,696 | A | 3/1976 | Lubnow | |
| 4,186,681 | A * | 2/1980 | Gish | 114/240 R |
| 4,220,108 | A * | 9/1980 | Burt | 114/244 |
| 4,262,595 | A * | 4/1981 | Longerich | 102/402 |
| 4,627,891 | A * | 12/1986 | Gibbard | 205/799 |
| 4,697,522 | A * | 10/1987 | Groschupp et al. | 102/402 |
| 4,840,105 | A | 6/1989 | Ladan et al. | |
| 5,001,485 | A * | 3/1991 | Jones | 342/13 |
| 5,245,928 | A * | 9/1993 | Jasper | 102/402 |
| 5,277,177 | A | 1/1994 | Page et al. | |

(Continued)

OTHER PUBLICATIONS

"James Bonding with a 26 Inch Boat," dcmilitary.com article (dated Aug. 5, 2011).

*Primary Examiner* — Michael David
(74) *Attorney, Agent, or Firm* — Fredric J. Zimmerman

(57) ABSTRACT

Mine neutralization provides for radio control of a small boat having associated therewith: a projection mounted onto the boat and pointing forward; a primary magnet; a housing holding the primary magnet and joined at the front end of the projection; a fluid-dynamically shaped explosive device detachably attached underneath the boat; at least one secondary magnet affixed to the explosive device; and, a rope or cable tautly connected at its upper end to the primary magnet and at its lower end to the explosive device. The boat journeys near a floating mine to bring about magnetic interaction between the primary magnet and the mine. The primary magnet magnetically attaches to the mine, and a pulling force is exerted on the explosive device. The explosive device detaches from the boat, moves toward the mine, and magnetically attaches (via at least one secondary magnet) to the mine.

21 Claims, 18 Drawing Sheets

(56) References Cited

U.S. PATENT DOCUMENTS

| | | | |
|---|---|---|---|
| 5,361,675 A | 11/1994 | Spektor et al. | |
| 5,892,360 A * | 4/1999 | Willer et al. | 324/326 |
| 6,174,209 B1 * | 1/2001 | Cooper | 440/12.5 |
| 6,182,553 B1 | 2/2001 | Peterson | |
| 6,213,021 B1 * | 4/2001 | Pickett | 102/402 |
| 6,286,431 B1 * | 9/2001 | Cangelosi | 102/402 |
| 6,453,788 B1 * | 9/2002 | Lebet et al. | 86/50 |
| 6,647,854 B1 | 11/2003 | Stottlemyer et al. | |
| 6,738,314 B1 | 5/2004 | Teeter et al. | |
| 6,766,745 B1 * | 7/2004 | Kuklinski et al. | 102/402 |
| 6,802,237 B1 * | 10/2004 | Jones et al. | 89/1.13 |
| 6,809,520 B1 * | 10/2004 | Nelson | 324/329 |
| 6,979,758 B2 * | 12/2005 | Eidelman et al. | 588/403 |
| 7,000,546 B1 * | 2/2006 | Bender et al. | 102/402 |
| 7,493,843 B2 | 2/2009 | Grosch et al. | |
| 7,658,149 B2 * | 2/2010 | Theobald et al. | 102/402 |
| 7,765,032 B2 | 7/2010 | Huston et al. | |
| 8,037,797 B1 | 10/2011 | Frank et al. | |
| 8,297,162 B2 | 10/2012 | Fournier | |
| 2002/0108485 A1 * | 8/2002 | Samland | 89/1.13 |
| 2003/0159573 A1 * | 8/2003 | Cangelosi | 89/1.13 |
| 2008/0041264 A1 * | 2/2008 | Fournier | 102/403 |
| 2008/0134871 A1 * | 6/2008 | Goldman et al. | 89/1.13 |
| 2013/0125741 A1 * | 5/2013 | Lambertus | 89/1.13 |
| 2013/0263725 A1 * | 10/2013 | Isserstedt | 89/1.13 |

\* cited by examiner

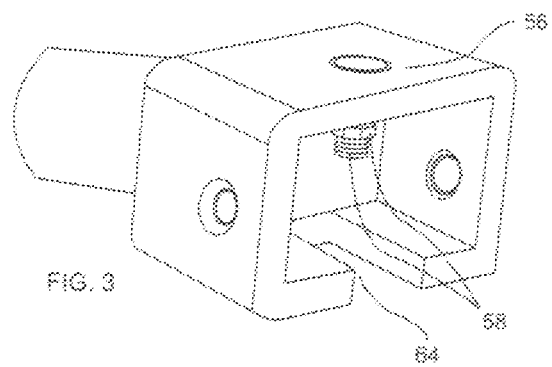
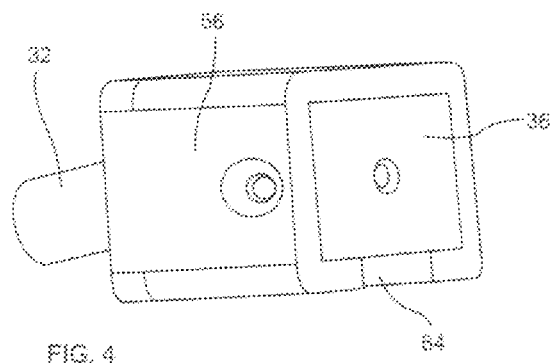
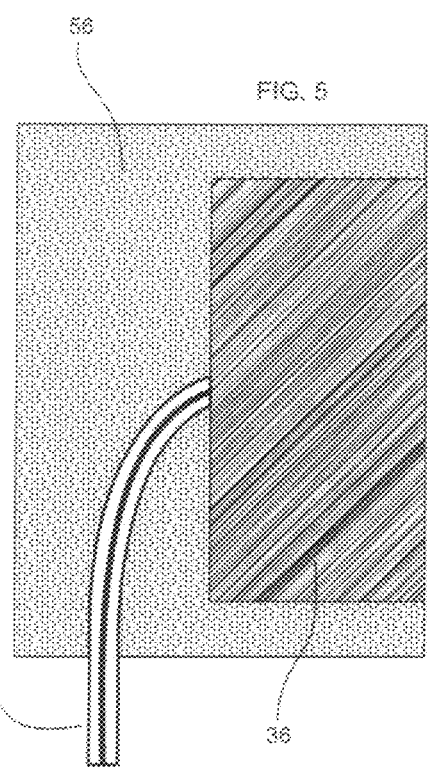

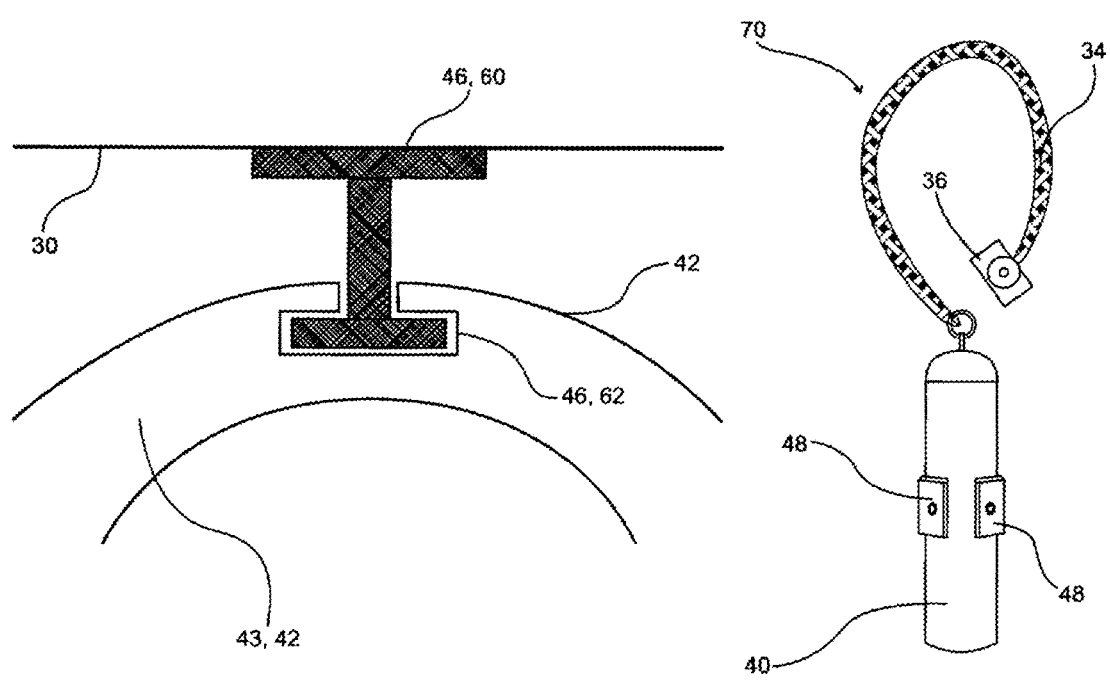

REMOTE CONTROL MINE NEUTRALIZATION DELIVERY SYSTEM

BACKGROUND OF THE INVENTION

The present invention relates to mines, more particularly to mine neutralization involving delivery of a mine-neutralizing payload, such as an explosive, to a location in the vicinity of a mine.

Mines are explosive devices that pose great threats to troops and ships. Most mines are "independent" in that, once placed, they do not require human maintenance or operation. Generally, there are two categories of mines, based on their situation, viz., "land mines" and "sea mines" (also known as "naval mines"). "Minefields" are areas where mines have been placed. Some mines are difficult to detect (e.g., concealed underground or underwater). A typical sea mine includes an explosive charge that is set to fire in response to the presence of a marine vehicle (e.g., a ship or submersible) in contact therewith or in proximity thereto. A sea mine may be designed to be triggered by direct contact and/or by indirect influence. "Floating" mines are buoyant sea mines that are partially visible above water.

Mine countermeasures (MCM) frequently involve detonation of a mine through the influence of an explosion or an artificially generated ship-like signature. For instance, a conventional strategy for sea mine neutralization provides for diver delivery of a high explosive to the mine; this is an extremely hazardous task. A better approach to mine neutralization is one that does not put people at significant risk.

SUMMARY OF THE INVENTION

In view of the foregoing, an object of the present invention is to provide an apparatus and an improved methodology for delivering a mine-triggering device to a mine. In accordance with exemplary practice of the present invention, an apparatus for delivering a payload, the apparatus includes a projection having an inboard end and an outboard end, a primary magnet, detachably attached to the projection at the outboard end, a payload, and a line connecting the primary magnet and the payload, and at least one secondary magnet, each joined with said payload. Further, a method is provided for delivering a payload. The inventive method includes combining payload delivery apparatus with a vehicle, and associating the payload with a destination object. The payload delivery apparatus includes: a projection (e.g., rod or beam) having an inboard end and an outboard end; a primary magnet detachably attached to the projection at the outboard end; a payload; a line connecting the primary magnet and the payload; and, at least one secondary magnet each joined with the payload. The combining includes mounting the projection on the vehicle at the inboard end so that the outboard end extends forward of the vehicle, and detachably attaching the payload beneath the vehicle so that the line is under tension. The associating includes navigating the vehicle toward the object to a location proximate the object so that: the primary magnet magnetically affixes to the object; the payload detaches from the vehicle and moves toward and near the object; and, at least one secondary magnet magnetically affixes to the object. The payload delivery apparatus includes a radio control receiver for remote operation of the vessel via a radio control system. The radio control system is used for navigating the vessel toward and away from the object.

Practice of the present invention is possible for delivering practically any kind of payload in practically any context. Inventive practice can be especially propitious in the realm of mine neutralization. According to many embodiments of the present invention, the payload delivery apparatus is mine neutralization delivery apparatus, the payload is an explosive device, the destination object is a mine, and the associating is of the explosive device with the mine. The inventive method includes combining mine neutralization delivery apparatus with a vehicle, and associating the explosive device with the mine. The mine neutralization delivery apparatus includes: a projection (e.g., rod or beam) having an inboard end and an outboard end; a primary magnet detachably attached to the projection at the outboard end; an explosive device; a line connecting the primary magnet and the explosive device; and, at least one secondary magnet each joined with the explosive device. The combining includes mounting the projection on the vehicle at the inboard end so that the outboard end extends forward of the vehicle, and detachably attaching the explosive device beneath the vehicle so that the line is under tension. The associating includes navigating the vehicle toward the mine to a location proximate the mine so that: the primary magnet magnetically affixes to the mine; the payload detaches from the vehicle and moves toward and near the mine; and, at least one secondary magnet magnetically affixes to the mine. The mine neutralization delivery apparatus includes a radio control receiver for remote operation of the vessel via a radio control system. The radio control system is used for navigating the vessel toward and away from the mine.

A major advantage of inventive practice is the minimization of risk to humans, especially in applications involving mines as targets. According to exemplary inventive practice, a boat is remotely controlled to deliver a detonative explosive to a floating sea mine; the human controllers are out of harm's way, as they are operating the vehicle from afar. Another notable advantage of exemplary inventive practice is the potentially low cost of fabrication and operation, since inexpensive commercially available items can be purchased and implemented for constituting parts and components of an inventive system.

BRIEF DESCRIPTION OF THE DRAWINGS

The present invention will now be described, by way of example, with reference to the accompanying drawings, wherein:

FIGS. 3 through 5 illustrate a primary magnet and magnet housing such as depicted in FIG. 1.

FIG. 3 is a perspective view of the housing without primary magnet.

FIG. 4 is a perspective view of the housing together with the primary magnet.

FIG. 5 is a side view of the housing together with the primary magnet, also showing a portion of the line (e.g., rope or cable) connecting the primary magnet to an inventive system's explosive device (not shown in FIG. 5).

FIG. 7 is a cross-sectional view of a sliding mechanism, such as shown in FIG. 1, in which a sliding member projects from a boat and engages a slot in an explosive device.

FIG. 8 is a perspective view of a deliverable explosive unit such as depicted in FIG. 1. The deliverable explosive unit includes a primary magnet, a line, and an explosive device (having, by way of example, four secondary magnets attached thereto).

FIGS. 10 through 18 are elevation views illustrative of sequential stages of the inventive delivery.

FIG. 19 is a perspective view of the culminating combination, similarly as shown in FIG. 9, of a deliverable explosive unit and a sea mine.

FIG. 20 is analogous to FIG. 12, the main difference being that FIG. 12 shows continued magnetic attachment of the primary magnet to the magnet housing upon magnetic attachment of the primary magnet to the mine, whereas FIG. 20 shows detachment (and separation) of the primary magnet from the magnet housing upon magnetic attachment of the primary magnet to the mine.

FIG. 21 shows, in a side view, how inventive practice is possible for various angularities of the magnet arm with respect to the water surface, and for various angularities of the magnet housing with respect to the length of the magnet arm.

DESCRIPTION OF EXEMPLARY EMBODIMENTS OF THE INVENTION

Figure 1:
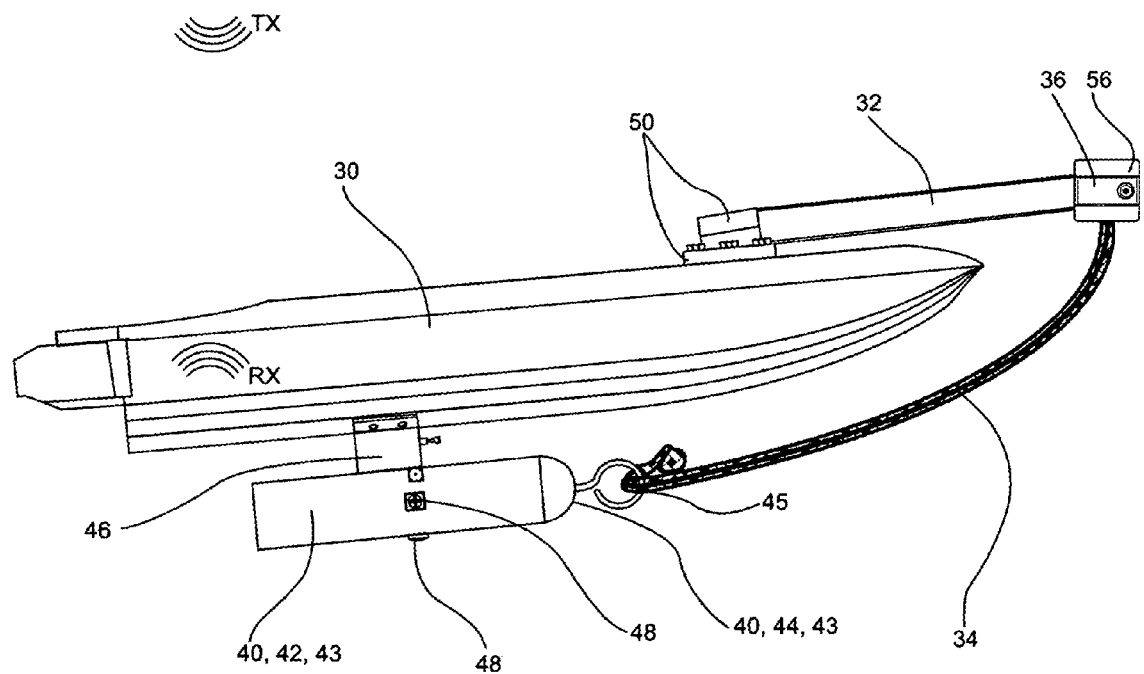
FIG. 1 is a side elevation view of an example of a remote control mine neutralization delivery system in accordance with the present invention.
Figure 2:
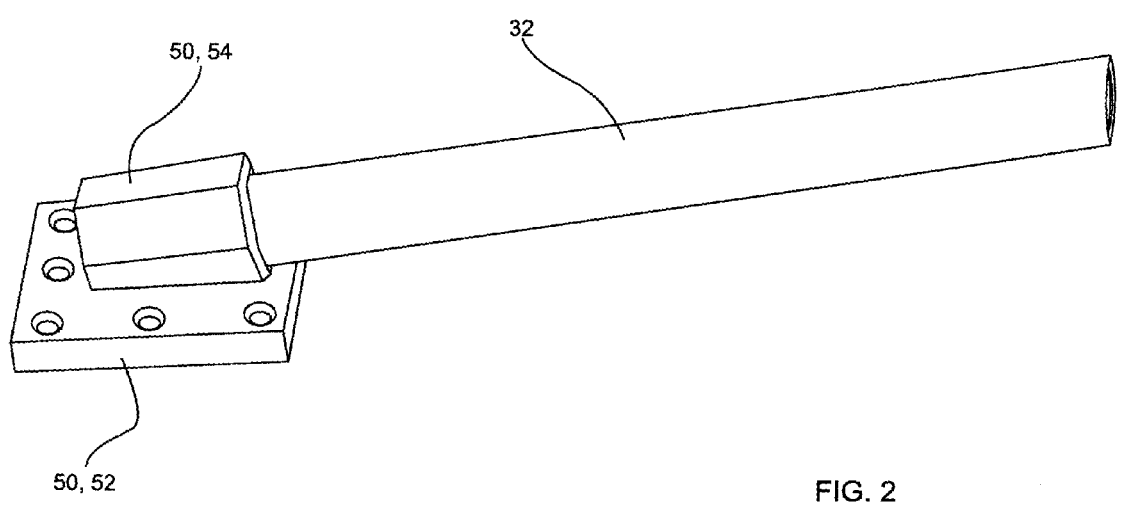
FIG. 2 is a perspective view of an arm and arm mount such as depicted in FIG. 1.
Figure 6:
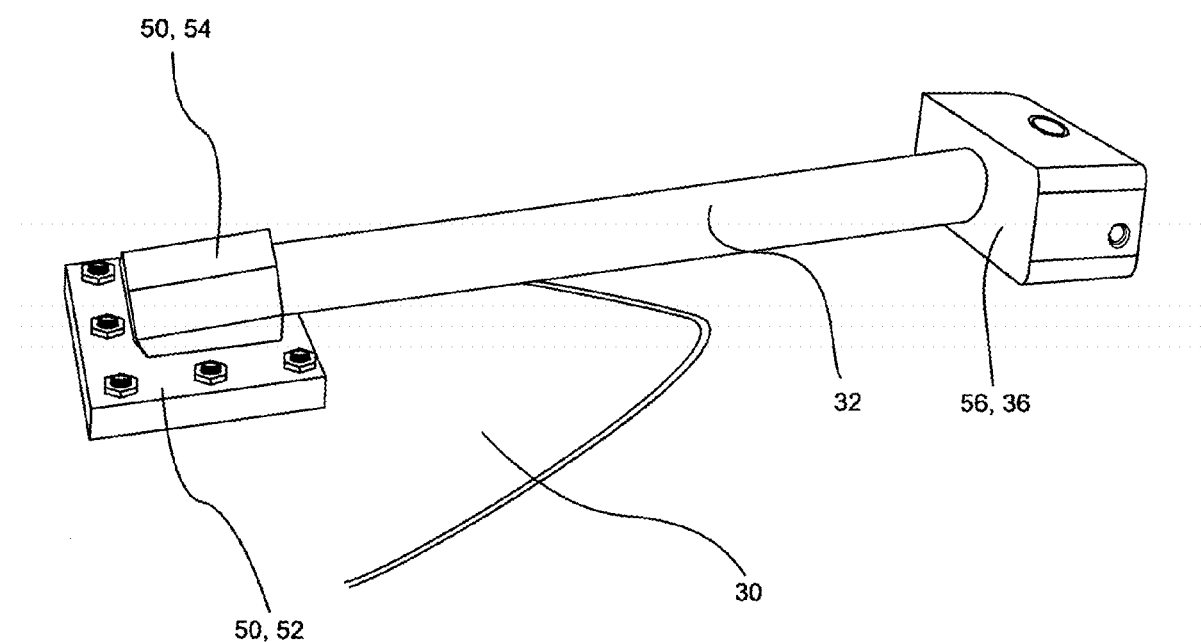
FIG. 6 is a perspective view of a boat, arm, arm mount, and magnet housing such as depicted in FIG. 1.
Figure 9:
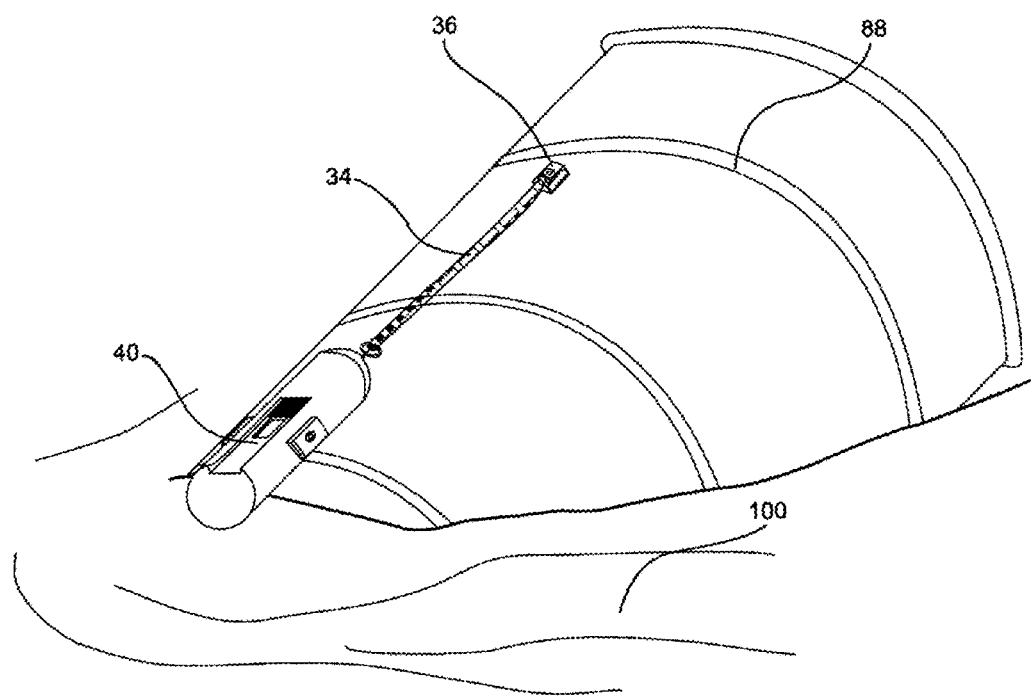
FIG. 9 is a perspective view of a deliverable explosive unit (which includes a primary magnet, a line, and an explosive device such as depicted in FIG. 1) and a cylindrical buoyant sea mine. The deliverable explosive unit is shown coupled with the mine, the primary magnet shown magnetically attached to an upper portion of the mine, a secondary magnet shown magnetically attached to a lower portion of the mine.

Referring now to FIGS. 1 through 9, a small, radio-operated boat 30 is equipped with an arm 32, a line 34, a primary magnet 36, a magnet housing 56, an explosive device 40, four secondary magnets 48, a sliding mechanism 46, and a radio receiver RX. Boat 30 is also equipped with apparatus for propelling and steering. A radio transmitter TX, remotely located, sends radio control signals to radio receiver RX for controlling propulsion and maneuvering of boat 30.

According to exemplary inventive practice, explosive device 40 is characterized by a hydrodynamic shape such as the cylindrical projectile shape shown in FIGS. 1 and 8 through 20. Torpedo-like explosive device 40 has a longitudinal axis, a rounded front end cap 44 and a cylindrical body 42. The longitudinal axis of explosive device 40 is aligned with the longitudinal centerline of boat 30. The main exterior portion of explosive device 40 is a casing, which encloses a high explosive. Attached (e.g., fastened or adhered) to the casing 43 of cylindrical body 42 are secondary magnets 48, spaced apart circumferentially at ninety degree intervals.

It should be emphasized that practice of the invention is possible in land and/or air and/or marine environments. The transport-and-delivery vehicle may travel on the ground, and/or in the air, and/or on the water surface, and/or underwater. Accordingly, exemplary practice of the present invention may provide for a "fluid-dynamic" shape, hydrodynamic and/or aerodynamic, which a practitioner of the present invention may tailor to the contemplated application(s).

Arm 32 points forward and outboard, and is firmly attached at its back end to boat 30 at an elevated inboard location via a mount 50. Mount 50 includes a mounting plate 52 (for attachment of mount 50 at the topside of boat 30) and a tubular holder 54 (for holding arm 32 at the back end of arm 32). A magnet housing 56 is coupled with arm 32 at its forward end and holds primary magnet 36 so that it remains in place in the absence of a magnetic attraction that will be exerted by primary magnet 36 upon the ferromagnetic material (e.g., metal) of a sea mine 88.

For instance, primary magnet 36 may be held in place by magnet housing 56 through magnetic attraction of primary magnet 36 with respect to a ferromagnetic member 58, such as a specially adapted ferromagnetic (e.g., metal) piece inside magnet housing 56, or a ferromagnetic fastener (e.g., a nut, bolt, screw, or washer) that joins magnet housing 56 with arm 32. When primary magnet 36 encounters a ferromagnetic mine 88, the force of magnetic attraction of primary magnet 36 with respect to the mine 88 will exceed the force of magnetic attraction with respect to the fastener 58. Consequently, either during or after the exertion of magnetic attraction of primary magnet 36 with respect to the mine 88, primary magnet 36 will be released from housing 56.

Line 34, for instance a rope or cable, connects primary magnet 36 and explosive device 40. Line 34 is fastened at its opposite ends to primary magnet 36 and explosive device 40, respectively. FIG. 1 shows an example in which line 34 is tied to a hook or eyelet 45 that is joined with explosive device 40 at the forward-most axial-longitudinal point of its front end cap 44. As shown in FIGS. 3 and 4, magnet housing 56 is provided with a lower opening 64 to accommodate line 34 so that it may pass through housing opening 64 and connect primary magnet 36 with explosive device 40.

Figure 12:
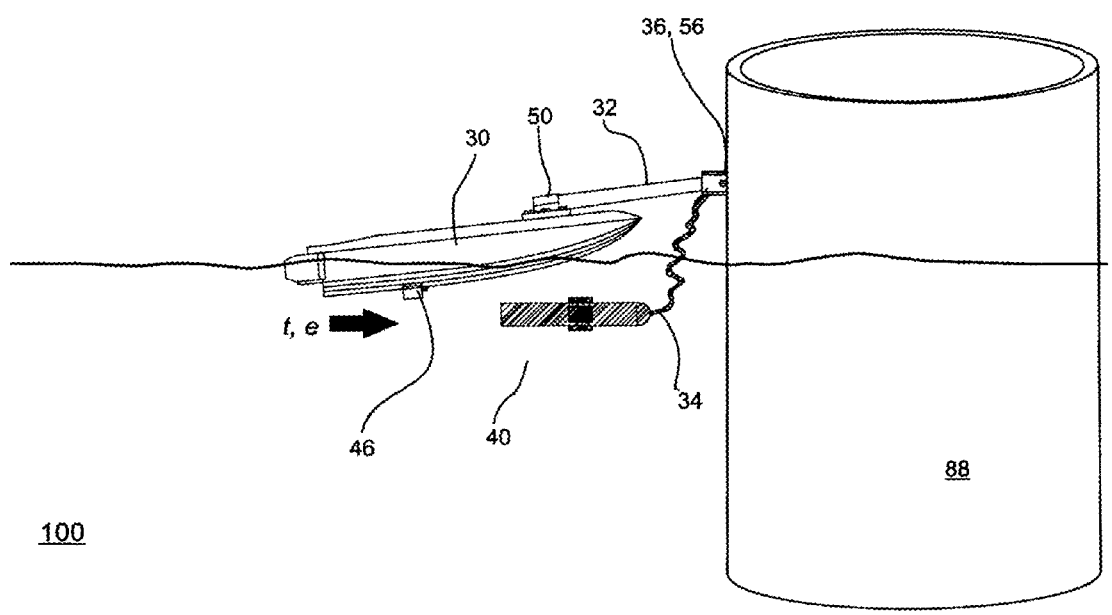

As shown in FIG. 7, sliding mechanism 46 includes a sliding member 60 and a T-slot 62. Sliding mechanism 46 is designed for facilitating forward sliding movement of explosive device 40 in its forward axial-longitudinal direction e as shown in FIG. 12. Sliding member 60 is attached at the hull underside of boat 30, and protrudes downward for slidable engagement with T-slot 62. T-slot 62 is integrated with the casing 43 of explosive device 40 to minimize drag, thereby furthering the hydrodynamic quality of explosive device 40.

An important component of exemplary inventive practice is the deliverable explosive unit 70, such as depicted in FIG. 8. Deliverable explosive unit 70 is the combination of elements including primary magnet 36, line 34, and explosive device 40. The main objective of exemplary inventive embodiments is for deliverable explosive unit 70 to be securely situated so as to be magnetically attached to mine 88 via both an upper "permanent" magnet (primary magnet 36) and a lower "permanent" magnet (secondary magnet 48). As shown by way of example in FIGS. 9, 18, and 19, the attached primary and secondary magnets 36 and 48 are approximately vertically aligned, primary magnet 36 above secondary magnet 48, whereby the line 34 extending therebetween is at least substantially straight.

Still with reference to FIGS. 1 through 9, and particularly with reference to FIGS. 10 through 21, exemplary inventive practice aims to remotely control a boat 30 so as to navigate through water 100 toward mine 88, leave deliverable explosive unit 70 secured to mine 88, and navigate away from mine 88. The drawings generally reflects exemplary inventive practice according to the testing of an inventive delivery system prototype that was conducted by the present inventors.

Figure 10:
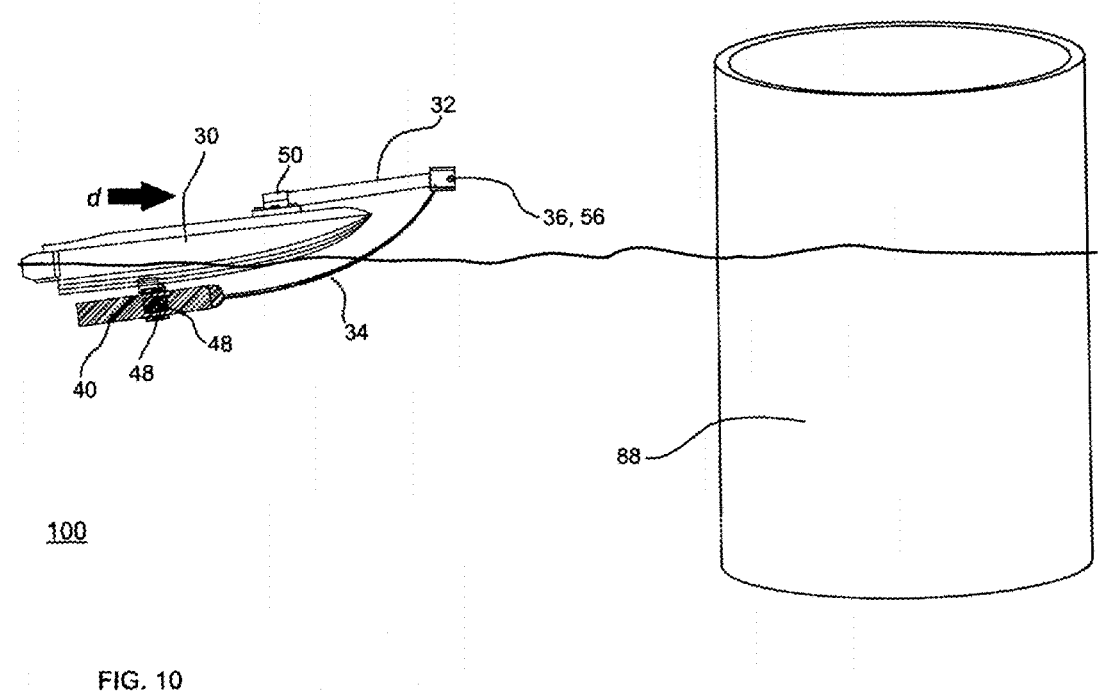
FIGS. 10 through 21 illustrate exemplary practice, in accordance with the present invention, of remotely controlled delivery of mine neutralization capability to a sea mine.
Figure 11:
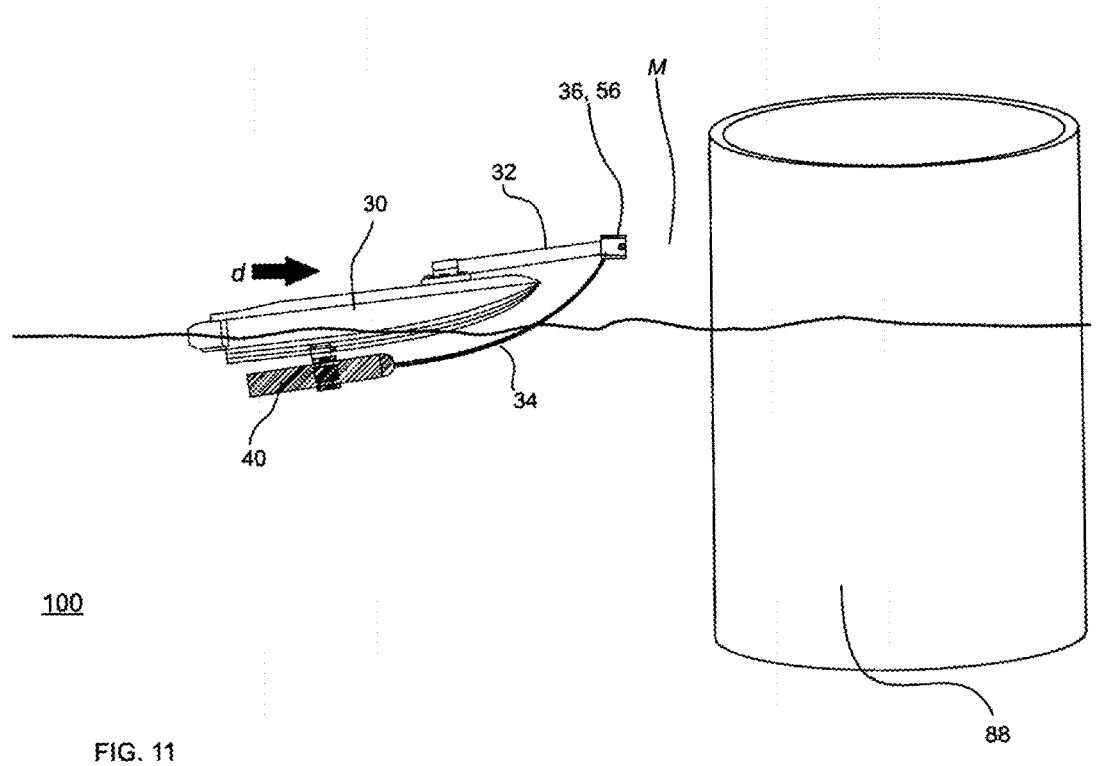

As shown in FIG. 10, the remotely controlled, inventively equipped boat 30 travels in direction d, approaching mine 88. Direction d is approximately perpendicular to the surface of mine 88. Inventive practice may provide for such approach at a low rate of speed, particularly as boat 30 moves near mine 88. Line 34 tautly connects primary magnet 36 with explosive device 40. As shown in FIG. 11, when boat 30 is sufficiently close to mine 88, the magnetically attractive force M of primary magnet 36 commences, drawing primary magnet 36 toward mine 88. As shown in FIG. 12, primary magnet 36 magnetically attaches to mine 88. The magnetic attraction and resultant attachment of primary magnet 36 to mine 88, illustrated in FIGS. 11 and 12, cause a tugging (pulling) force upon explosive device 40 in tugging direction t, which is approximately perpendicular to the facing surface of mine 88. Explosive device 40 disengages (slides away) from boat 30, moving in direction t toward mine 88, line 34 concurrently slackening.

The trajectory of explosive device 40 in direction t, toward mine 88, is at least substantially straight, mainly because of the relatively high mass (weight) of explosive device 30, and the axial-longitudinal direction in which explosive device 30 is pointing when attached beneath boat 30 via sliding mechanism 46. According to exemplary embodiments, explosive device 30 is sufficiently heavy (massive) that its momentum will carry it in at least substantially linear path, generally in the approximately horizontal direction of its longitudinal axis, until its front end section contacts mine 88.

Figure 13:
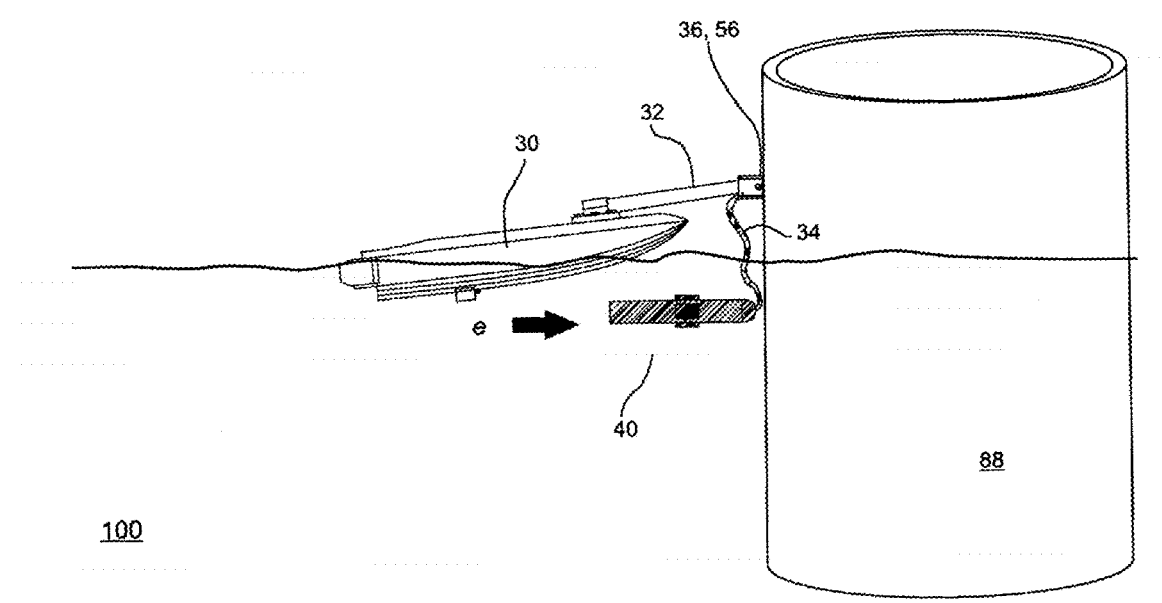
Figure 14:
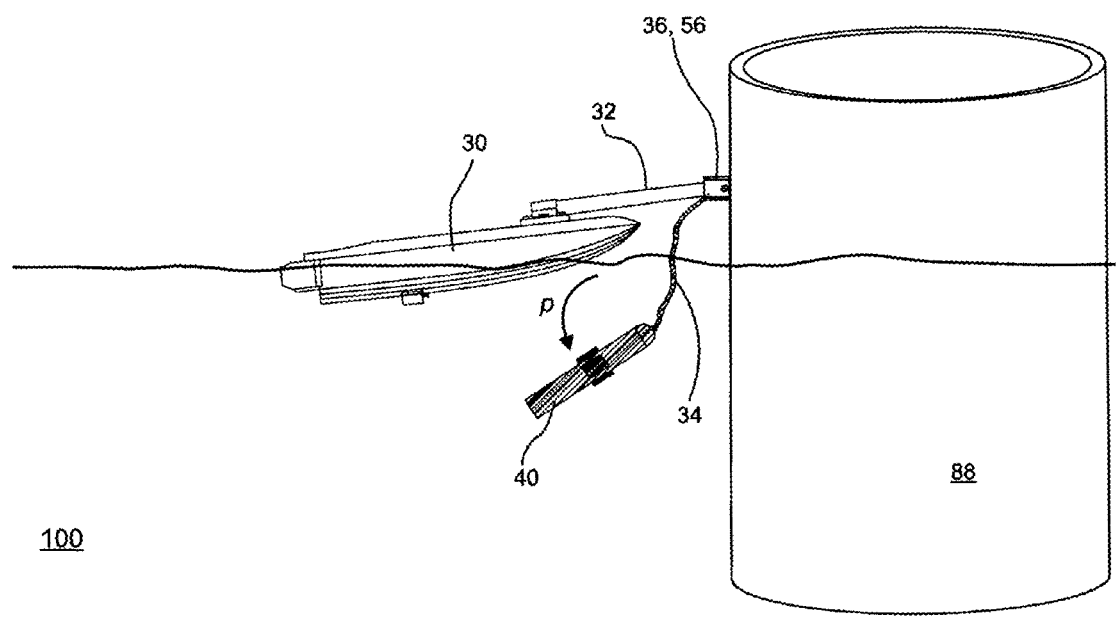
Figure 15:
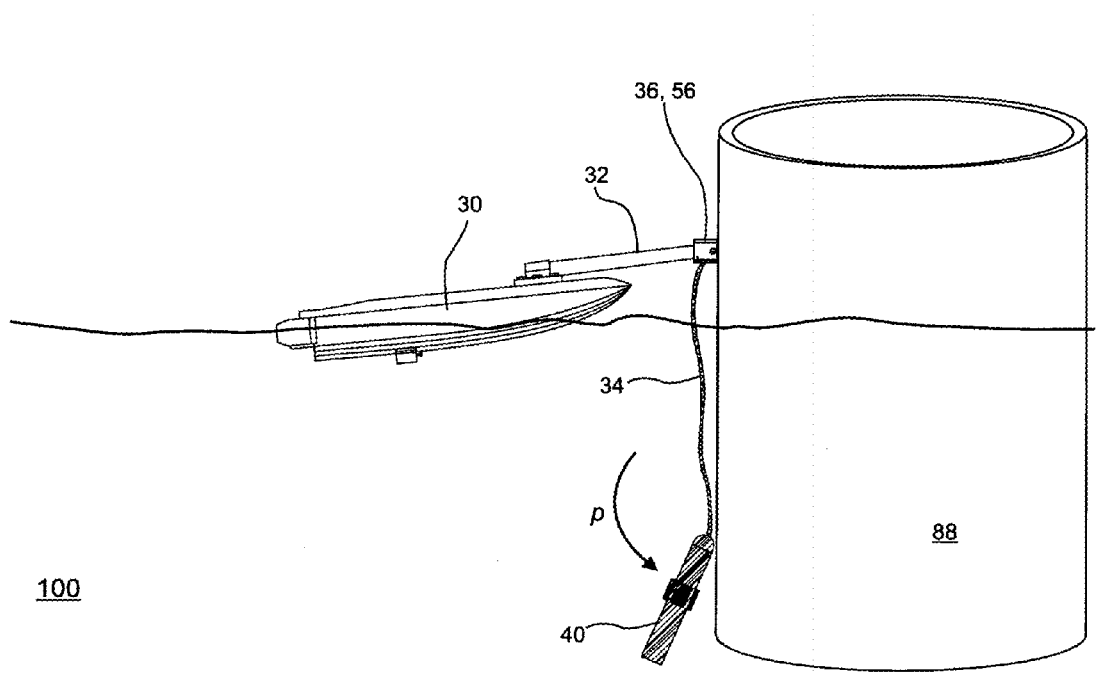
Figure 16:
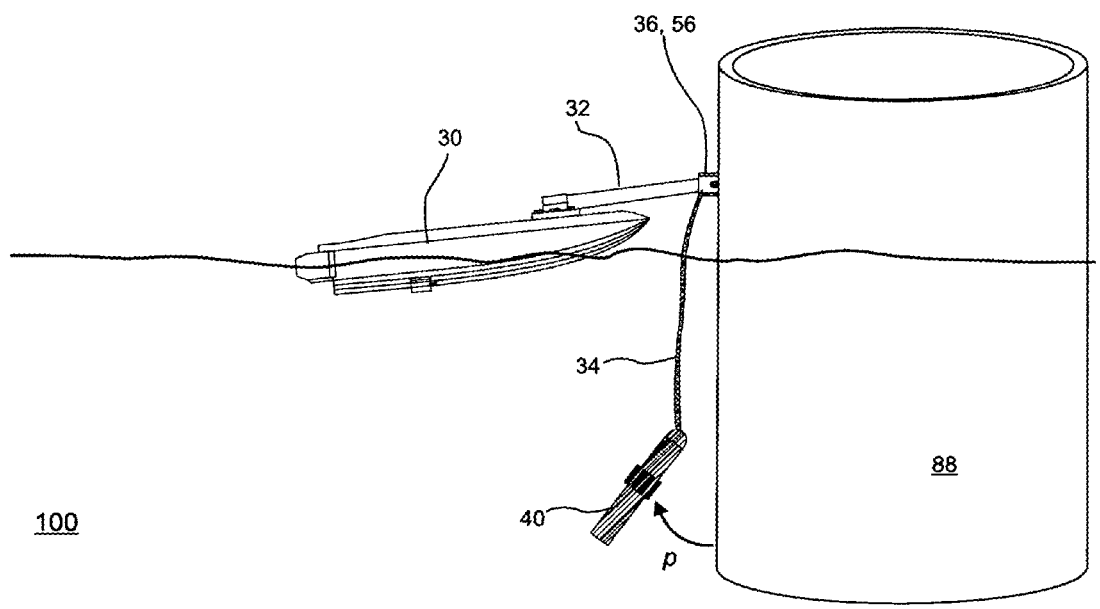
Figure 17:
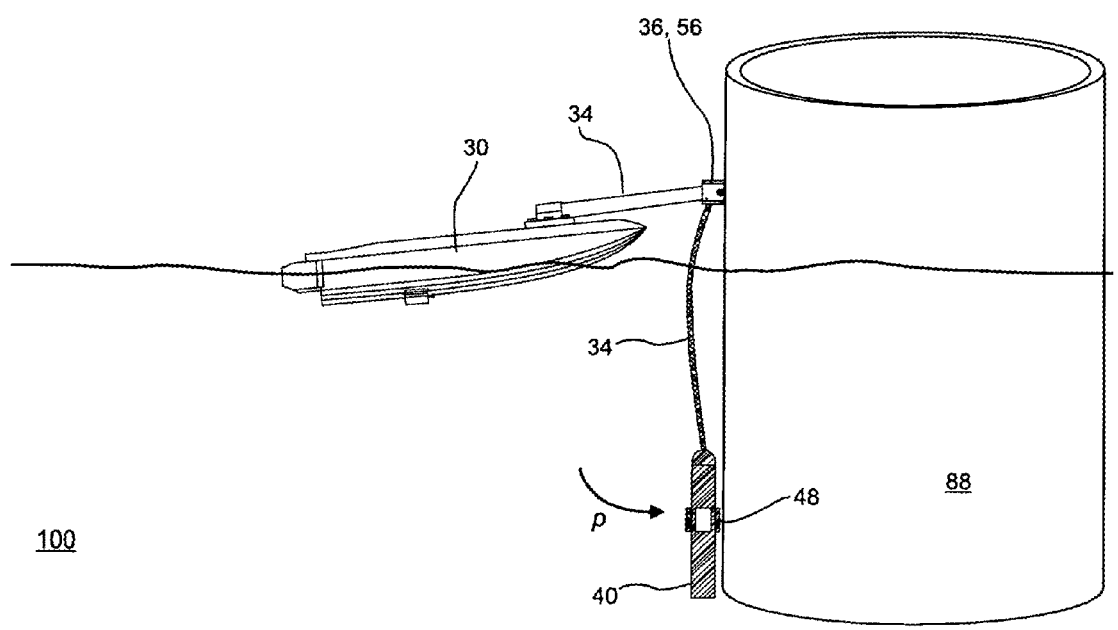

As shown in FIG. 13 and FIG. 14, the front end section 44 of explosive device 40 strikes the circumferential surface of mine 88. Following this initial impact of explosive device 40 upon mine 88, explosive device 40 moves in post-impact direction p. As shown in FIG. 14 and FIG. 15, explosive device 40 rebounds off mine 88 and rotates downward (FIG. 14), until again striking mine 88 (FIG. 15) and again rebounding off mine 88 (FIG. 16). Explosive device 40 again moves toward mine 88 and, as shown in FIG. 17, eventually settles into an approximately vertical position whereby one of the four secondary magnets 48 magnetically attaches to mine 88.

The dynamics of explosive device 40, after detaching from boat 30, may differ depending on the inventive embodiment, or may even differ depending on the nature of the delivery by the same inventive embodiment. The explosive device 40 may impact the mine 88 and simultaneously attach magnetically to the mine, without rebounding, via at least one of the secondary magnets that are affixed to the explosive device. Alternatively, the explosive device 40 may impact the mine 88 and rebound (ricochet or bounce) off the mine, subsequently attaching magnetically to the mine via one or more secondary magnets. If the explosive device rebounds from the mine, it may occur that the explosive device lowers (drops or sinks) in the water, and the line thereby slackens so that the explosive device suspends from the primary magnet and swings (pendulates) once or more than once until magnetically attaching to the mine via one or more secondary magnets.

A fewer or greater number of secondary magnets 48 (even just one secondary magnet 48) may be used in inventive practice, depending on the exemplary embodiment. The secondary magnets 48 in this example are numbered and configured for increasing or maximizing the probability of magnetic attachment of a secondary magnet 48 to mine 88, subsequent to magnetic attachment of primary magnet 36 to mine 88.

Figure 18:
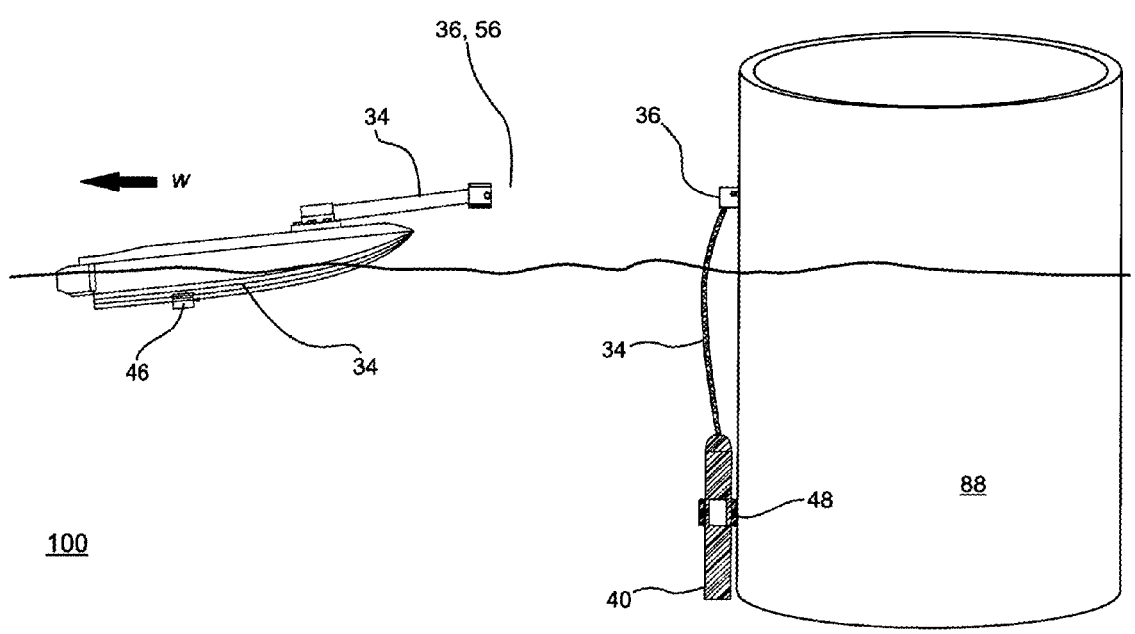
Figure 19:
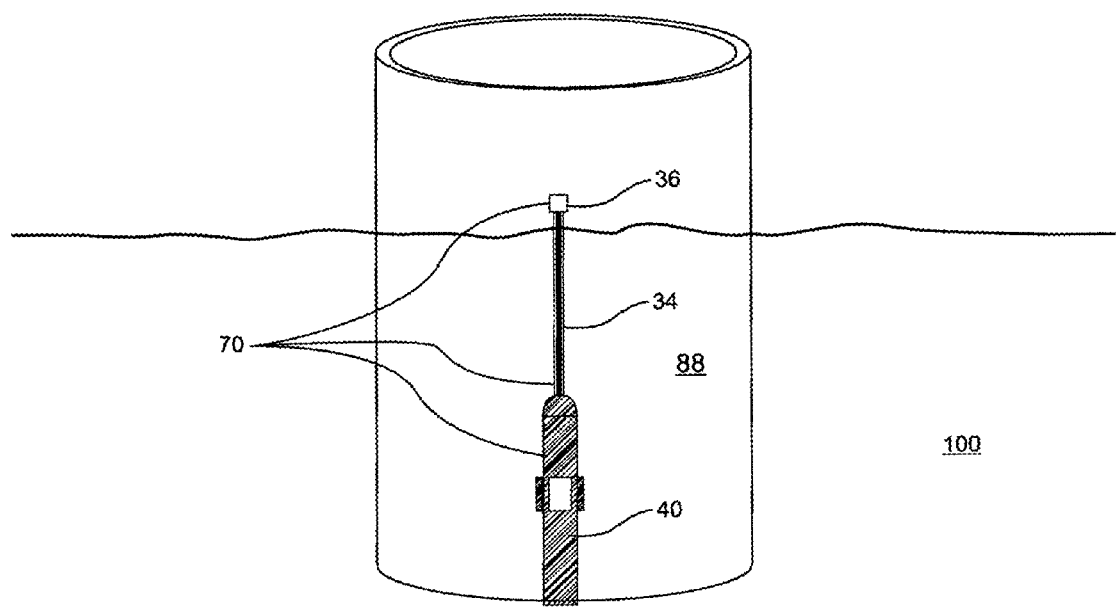

As shown in FIG. 18, boat 30 maneuvers (e.g., backward and/or side-to-side) so as to detach magnet housing 56 from primary magnet 36, which is magnetically attached to mine 88. Boat 30 retreats from mine 88 in withdrawal direction w, moving generally backward and then turning around to move generally forward, eventually reaching a safe distance from mine 88. With the operators remaining safely distanced from mine 88, and the boat 30 having become safely distanced from mine 88, the operators may generate a radio signal or acoustic signal, specially coded to actuate explosive device 40.

Figure 20:
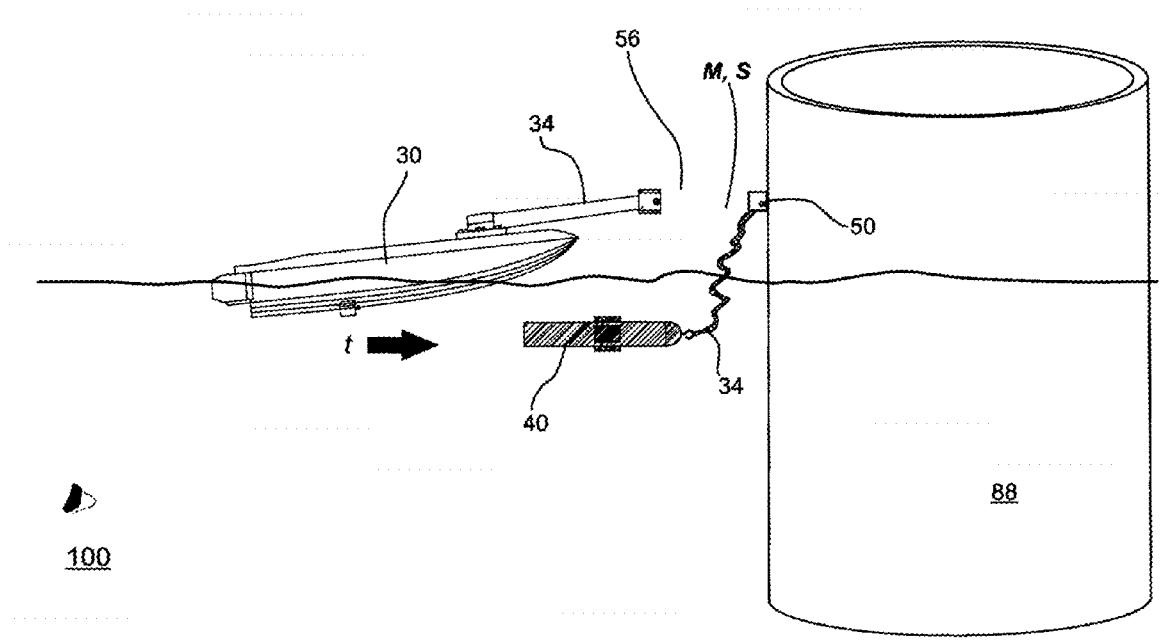

Depending on the exemplary embodiments and applications of the present invention, the magnetic attachment of primary magnet 36 to mine 88 may take place with either of two concomitant circumstances, viz.: (i) continued magnetic attachment of primary magnet 36 (via ferromagnetic member 58) to magnet housing 56, such as shown in FIG. 12; or, (i) discontinued magnetic attachment of primary magnet 36 (via ferromagnetic member 58) to magnet housing 56, such as shown in FIG. 20. According to exemplary embodiments, the magnetic attraction of primary magnet 36 to mine 88 may concurrently bring about detachment of primary magnet 36 from mine 88. Regardless, the usual condition in exemplary inventive practice is that the magnetic attraction of primary magnet 36 to mine 88 considerably exceeds the magnetic attraction of primary magnet 36 to ferromagnetic member 58, which is associated with magnet housing 56.

Generally speaking, the magnetic force of a magnet is proportional to the surface area of the object to which the magnet is attracted. Therefore, the magnitude of the magnetic attraction of a primary magnet 36 to the mine 88 will generally far exceed the magnitude of the magnetic attraction of primary magnet 36 to the ferromagnetic member 58. As illustrated in FIG. 12 through FIG. 17, primary magnet 36 remains held by magnet housing 56 during the magnetic attraction of primary magnet 36 to mine 88, and remotely controlled maneuvering of boat 30 may likely be necessary to separate primary magnet 36 from magnet housing 56. Alternatively, as portrayed in FIG. 20, the magnetic attraction of primary magnet 36 to mine 88 simultaneously brings about detachment of primary magnet 36 from mine 88.

The inventive stages respectively shown in FIG. 12 and FIG. 20 are analogues. FIG. 12 shows continued attachment of primary magnet 36 to magnet housing 56 while primary magnet magnetically attracts mine 88, both prior to and during magnetic attachment of primary magnet 36 to mine 88. In contrast, FIG. 20 shows detachment and separation S of primary magnet 36 from magnet housing 56 coincidental with magnetic attraction and attachment of primary magnet 36 to mine 88. Separation S is the ensuing distance obtained between primary magnet 36 and magnet housing 56 upon magnetic attraction M between primary magnet 36 and mine 88. Regardless of whether primary magnet 36 remains coupled with magnet housing 56 during a state of magnetic attraction between primary magnetic 36 and mine 88, the ensuing stages shown in FIG. 13 through FIG. 18 are generally similar.

Figure 21:
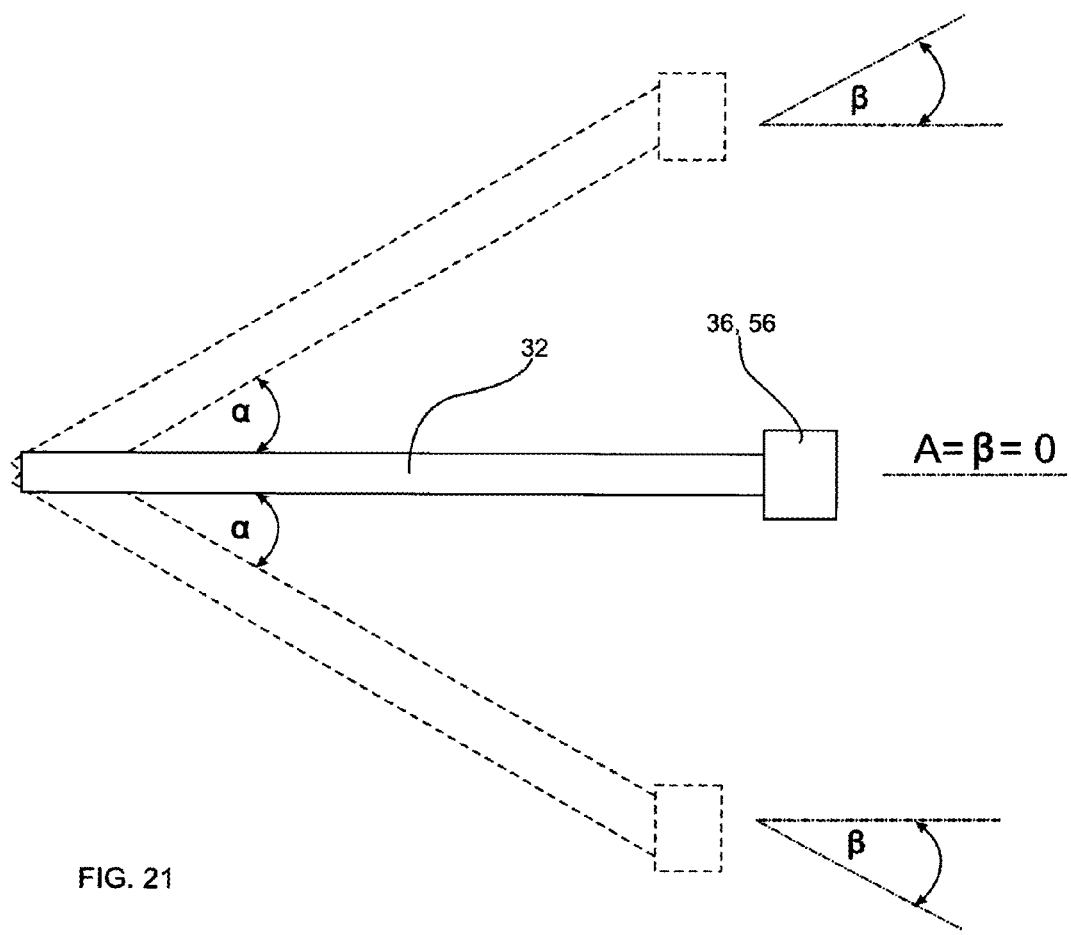

As illustrated in FIG. 21, the forward vertical angles of the arm. 32 and/or the primary magnet 36 and/or the magnet housing 56 are variable among the diverse embodiments of the present invention. The longitudinal axis of arm 32 has an angle α with respect to the horizontal geometric plane (generally corresponding to the surface of water 100). The longitudinal axis of magnet housing 56 has an angle β with respect to the longitudinal axis of arm 32. For instance, as exemplified by the inventive system shown in FIG. 1, the present invention may be embodied as having an upward arm angle α and a downward housing angle β that equals arm angle α in magnitude (e.g., about fifteen degrees), with the result that the primary magnet assumes an about horizontal orientation for contacting the mine. Depending on the inventive embodiment, oblique angles alpha (α) and beta (β) may each be upward or downward, and may each be slight, moderate, or considerable (e.g., approximately thirty degrees such as shown in FIG. 21, or even forty-five degrees or higher). The present invention may be practiced, in exemplary embodiments, whereby the primary magnet's forward face is vertical, or whereby the primary magnet's forward face is non-vertical.

Multifarious types, shapes, designs, and variations of vehicles, lines, payloads, and other inventive features may be implemented in inventive practice. For instance, the payload may be an explosive or non-explosive payload. The vehicle may be water, ground, and/or air. Diverse configurations of the marine vessel and/or the payload are possible for fostering fluid-dynamic movement of the payload. The mine or other target may, in exemplary embodiments, have practically any shape—cylindrical, spherical, prolate spheroidal, irregular, etc.—the most important consideration in this regard being that the primary and secondary magnets be able to magnetically attach to the target. Furthermore, the exemplary embodiments described herein are characterized by forward projection of the magnet's arm, lying in the vertical geometric plane of the boat's centerline; however, inventive practice is possible in which a magnet's arm projects at an angle with respect to the vertical geometric plane of the boat's centerline, for instance from a starboard or port location.

The inventive sequence of events leading to attachment of deliverable explosive unit 70 to mine 88 may differ among inventive exemplary embodiments, even markedly so. For instance, according to some inventive embodiments, a secondary magnet 48 may magnetically attach to mine 88 the first time that the mine 88 is struck by explosive device 40. On the other hand, a great deal of movement of explosive device 40 in various directions may occur before explosive device 40 eventually settles into a fixed position of magnetic attachment to mine 88 by both the primary magnet 36 and the secondary magnet 48.

In some cases, inventive practice may accomplish its mission even if the events do not go completely according to plan, so to speak; that is, there may be acceptable risks. For instance, it may be acceptable if the primary magnet attaches to the mine, but the secondary magnet does not attach to the mine, as the primary magnet may be sufficient for affixing the deliverable explosive unit to the mine. As another example, it may be acceptable if the primary magnet fails to detach from its housing, and the boat is therefore prevented from leaving the vicinity of the mine. Inventive practice may be economical in that relatively low-cost commercially available items may be used as most or all of the parts and components. In terms of significance, the sacrifice of an inexpensive boat upon explosive detonation of a dangerous mine may be very much outweighed by the destruction of the mine.

The present invention; which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

Any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An apparatus for delivering a payload, comprising:
a projection including an inboard end and an outboard end;
a primary magnet being detachably attached to said projection at said outboard end;
a payload;
a line connecting said primary magnet and said payload; and
at least one secondary magnet, each joined with said payload,
wherein the line is situated intermediate the primary magnet and the payload, which is an explosive device.

2. The apparatus of claim 1, wherein the apparatus is capable of combination with a marine vessel by a method, which includes mounting said projection on said vessel at said inboard end so that said outboard end extends forward of said vessel, and detachably attaching said explosive device beneath said vessel so that said line is under tension.

3. The apparatus of claim 1, wherein said explosive device includes a hydrodynamic casing to facilitate the motion of said explosive device toward and near a sea mine upon detachment of said explosive device from a vessel.

4. A method for delivering a payload, comprising: combining payload delivery apparatus with a vehicle,
wherein the payload delivery apparatus includes a rod having an inboard end and an outboard end, a primary magnet detachably attached to the rod at the outboard end, a payload, a line connects the primary magnet and the payload, and at least one second magnet each joined with the payload,
wherein said combining includes the rod is mounted on the vehicle at the inboard end so that the outboard end extends forward of the vehicle, and
wherein said combining includes the payload is detachably attached beneath the vehicle so that the line is under tension;
associating the payload with an object,
wherein said associating includes the vehicle is navigated toward the object to a location proximate the object so that the primary magnet magnetically affixes to the object,
wherein said associating includes the payload detaches from the vehicle and moves toward and near the object, and
wherein said associating includes at least one secondary magnet magnetically affixes to the object, and
wherein the line is situated intermediate the primary magnet and the payload, which is an explosive device.

5. The method of claim 4, wherein the payload delivery apparatus is a mine neutralization delivery apparatus, wherein the payload is an explosive device, and wherein the object is a mine, and wherein said associating includes the explosive device contacts the mine.

6. The method of claim 5, further comprising navigating the vehicle away from the mine, subsequent to the associating of the explosive device with the mine, wherein the apparatus includes a radio control system to operate, remotely, the vessel, and wherein the navigating of the vessel toward and away from the mine includes use of the radio control system.

7. The method of claim 5, wherein the primary magnet is detachable from the rod while the primary magnet magnetically affixes to the mine, and prior to said navigating of the vessel away from the mine.

8. The method of claim 5, wherein the primary magnet is attached to the rod while the primary magnet magnetically affixes to the mine, and wherein said navigating of the vessel away from the mine includes effecting detachment of the primary magnet from the rod.

9. The method of claim 5, wherein the vehicle is a marine vehicle, wherein the mine is a sea mine, and wherein the explosive device is characterized by a hydrodynamic shape to facilitate the motion of the explosive device through water upon detachment of the explosive device from the marine vehicle.

10. A mine neutralization delivery system, comprising:
a vessel;
an arm including two longitudinal arm ends, said arm coupled with said vessel at a first end of said two longitudinal arm ends and extending forward and outboard from said vessel;
an upper magnet being situated at a second end of said two longitudinal arm ends;
an explosive device being situated beneath said vessel;
at least one lower magnet each affixed to said explosive device; and
a line tautly connecting said upper magnet and said explosive device,
wherein the vessel is a marine vessel, and
wherein the line is situated intermediate the upper magnet and the explosive device.

11. The mine neutralization delivery system of claim 10, wherein said vessel includes an elevated inboard portion, and wherein said arm is coupled with said vessel at said elevated inboard portion.

12. The mine neutralization delivery system of claim 10, further comprising a housing for said upper magnet, wherein said housing is fastened at the second end, and wherein said upper magnet is magnetically attached to said housing at the second said arm end.

13. The mine neutralization delivery system of claim 10, further comprising a housing for said upper magnet,
wherein said housing is fastened at the second end, and
wherein said upper magnet is magnetically attached to said housing at the second said arm end; and
a slider mechanism for joining said explosive device and said vessel at the bottom of said vessel,
wherein said explosive device is capable of sliding forward so as to separate from said vessel.

14. The mine neutralization delivery system of claim 13, wherein neutralization of a mine includes the following events:
said vessel approaches said mine;
said upper magnet magnetically attaches to said mine;
said magnetic attachment of said upper magnet to said mine causes a tugging of said line on said explosive device;
said tugging of said line causes said explosive device to slide forward so as to separate from said vessel;
the separated said explosive device continues forward so as to contact said mine and continue in motion until at least one said lower magnet magnetically attaches to said mine.

15. The mine neutralization delivery system of claim 10, wherein a motion of said explosive device upon contact with a mine includes a pendulation motion of said explosive device, via said line, until at least one said lower magnet magnetically attaches to said mine.

16. The mine neutralization system of claim 15, wherein at least a portion of said mine is a ferromagnetic portion.

17. The mine neutralization system of claim 10, wherein at least a portion of said housing is a ferromagnetic portion.

18. The mine neutralization system of claim 10, further comprising a housing for said upper magnet, wherein said upper magnet is detachable from said housing.

19. The mine neutralization system of claim 15, wherein a first force of magnetic attraction of said upper magnet with respect to said mine exceeds a second force of magnetic attraction of said upper magnet with respect to said housing, and wherein said upper magnet is detachable from said housing while magnetically attaching to said mine.

20. The mine neutralization system of claim 10, further comprising a radio control receiver being located onboard said vessel, for remotely controlling said vessel.

21. The mine neutralization system of claim 10, further comprising a radio control transmitter, not located onboard said vessel, for remote control of said vessel.

* * * * *